(12) United States Patent
Elgrably

(10) Patent No.: US 7,359,862 B2
(45) Date of Patent: Apr. 15, 2008

(54) DATA PROCESSING SYSTEM INTENDED TO FACILITATE CONFRONTING AN OFFER AND A DEMAND

(75) Inventor: Eric Elgrably, Casablanca (MA)

(73) Assignee: Electronic, Mobile and Geographic B.V., Amsterdam (NL)

( * ) Notice: Subject to any disclaimer, the term of this patent is extended or adjusted under 35 U.S.C. 154(b) by 882 days.

(21) Appl. No.: 10/415,703

(22) PCT Filed: Nov. 7, 2001

(86) PCT No.: PCT/IB01/02102

§ 371 (c)(1),
(2), (4) Date: Jul. 22, 2003

(87) PCT Pub. No.: WO02/39332

PCT Pub. Date: May 16, 2002

(65) Prior Publication Data

US 2004/0030569 A1   Feb. 12, 2004

(30) Foreign Application Priority Data

Nov. 9, 2000   (GB) .................................. 0027408.4

(51) Int. Cl.
  *G06Q 10/00*   (2006.01)
(52) U.S. Cl. ........................................................ 705/1
(58) Field of Classification Search .................... 705/1
See application file for complete search history.

(56) References Cited

U.S. PATENT DOCUMENTS

| | | | |
|---|---|---|---|
| 5,794,207 A | 8/1998 | Walker et al. | |
| 5,794,219 A | 8/1998 | Brown | |
| 5,835,716 A * | 11/1998 | Hunt et al. | 709/213 |
| 6,058,379 A | 5/2000 | Odom et al. | |
| 6,098,051 A | 8/2000 | Lupien et al. | |
| 6,131,087 A | 10/2000 | Luke et al. | |
| 2006/0212388 A1* | 9/2006 | Van Luchene et al. | 705/39 |
| 2006/0242054 A1* | 10/2006 | Himmelstoin | 705/37 |

FOREIGN PATENT DOCUMENTS

| | | |
|---|---|---|
| DE | DD 119 487 A | 4/1976 |
| WO | WO 99/31613 | 6/1999 |

OTHER PUBLICATIONS

Loudin, Amanda, Buyer Beware; The number of Web-based services available to the warehouse industry is sizzying, so experts warn to choose carefully, Aug. 1, 2000, Warehouse Management, The Internet, pp. 1-3.*

* cited by examiner

Primary Examiner—Jamisue Plucinski
(74) Attorney, Agent, or Firm—Oliff & Berridge, PLC

(57) ABSTRACT

A data processing system (X) is adapted to confront an offer (O) and a demand (D), in particular in the field of transportation of travelers or goods. The system (X) receives requests corresponding to new offers/demands, formulated by users ($C_X$) of the data processing system and data corresponding to offers/demands not yet satisfied from a plurality of secondary data processing servers (A, B, C, E) themselves adapted to confront an offer and a demand. After receiving a request corresponding to a new offer/demand formulated by a user ($C_X$) of the data processing system (X), the system (X) verifies if there is an offer/demand ($O_A$, $D_A$, $O_B$, $D_B$, $O_C$, $O_B$, $D_B$) not yet satisfied, received from a secondary data processing server (A, B, C, E) or transmitted previously by a user of the data processing system, that can respond to the request. If not, the system (X) stores the request in the data processing system and/or sends data corresponding to the new request to at least one of the secondary data processing servers (A, B, C, E) to enable confrontation with an offer/demand responding to the new request received subsequently by the secondary data processing server (A, B, C, E).

21 Claims, 1 Drawing Sheet

DATA PROCESSING SYSTEM INTENDED TO FACILITATE CONFRONTING AN OFFER AND A DEMAND

Figure 1:
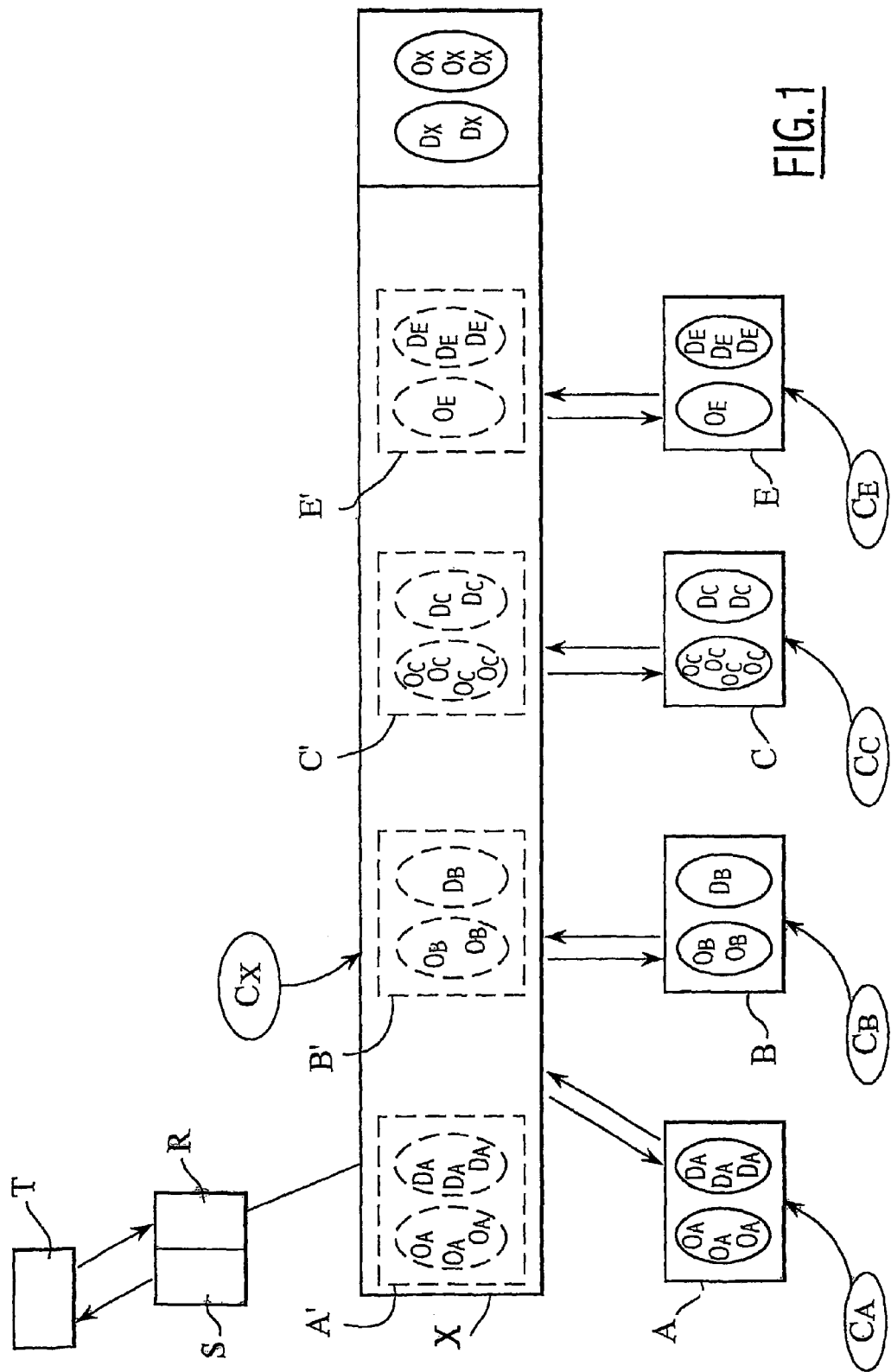

The present invention relates to a data processing system intended to facilitate confronting an offer and a demand, more particularly, although not exclusively, in the field of transporting goods or travelers.

A data processing system intended to facilitate confronting an offer and a demand, also referred to as a freight exchange in the case of transporting goods, receives offers from hauliers and demands from customers requiring to transport a given volume of goods from a departure point to an arrival point on a given date.

Users, whether hauliers or customers, must usually be subscribers to the freight exchange and their offers or demands receive a response only once they have been identified.

An object of the present invention is to provide a new data processing system which is capable of increasing the number of offers/demands consulted with the aim of responding to a demand/offer, to facilitate satisfying the user originating the demand/offer.

The new data processing system, adapted to confront an offer and a demand, in the field of freight or other fields, is characterized in that it is adapted to:

receive requests corresponding to new offers/demands, the requests being formulated by users of the data processing system, receive data corresponding to offers/demands not yet satisfied from a plurality of secondary data processing servers, the secondary data processing servers being themselves adapted to confront an offer and a demand, after receiving a new request corresponding to a new offer/demand formulated by a user of the data processing system, verify if there is an offer/demand not yet satisfied, received from a secondary data processing server or transmitted previously by a user of the data processing system, that can respond to the new request, and if not, store the new request in the data processing system and/or send data corresponding to the new request to at least one of the secondary data processing servers to enable confrontation with an offer/demand responding to the new request received subsequently by the secondary data processing server.

The data processing system of the invention provides virtual centralization of offers and demands, so to speak, and, with the invention, a user originating an offer or a demand need only consult one data processing system to obtain a response, because the data processing system searches secondary data processing servers to find a demand responding to the offer or vice-versa.

Thus, in a freight context, the data processing system of the invention can automatically interrogate a plurality of freight exchanges, and the user, whether a haulier or a customer, no longer has to consult the freight exchanges successively to obtain a response to their offer or demand.

The data processing system is preferably adapted to exchange data with a plurality of secondary data processing servers, at least two of which secondary data processing servers use different communication protocols.

At least one of the secondary data processing servers can be adapted not to respond to a request corresponding to an offer or to a demand until it has received identification information for identifying the user originating the request.

The data processing system is advantageously adapted, when a request corresponding to an offer/demand is sent to it by a user of the data processing system, to search for an offer/demand responding to the request in all the offers and demands consulted by the secondary data processing servers and in all the offers and demands internal to the data processing system.

The data processing system is preferably adapted to store and update automatically all offers and demands consulted in order to respond to a new request sent by a user of the data processing system, updating being effected at sufficiently short time intervals for the user of the data processing system to have access to recent offers or demands sent to the secondary data processing servers by the users thereof.

The data processing system is preferably adapted to store and update automatically the set of offers and demands consulted in order to respond to a new request sent by a user of the data processing system and, for each new offer/demand corresponding to a new request and included in the set, to verify if the offer/demand responds to a request previously formulated by a user of the data processing system.

When a user of the data processing system is a subscriber to only some of the secondary data processing servers consulted by the data processing system, in the event of a request formulated by that user which the data processing system has been unable to satisfy, the data processing system can transmit the request that has not been satisfied to only the secondary data processing server(s) of which the user is a client, to enable the request to be confronted with an offer/demand received subsequently by the secondary data processing server(s).

Each offer/demand repatriated by the data processing system from a secondary data processing server is advantageously assigned an index including information at least including the identity of the secondary data processing server originating the offer/demand.

The index preferably further includes information on the frequency with which the offer/demand has been consulted.

The index can further include information on for how long the offer/demand has been processed by the data processing system.

The data processing system is preferably adapted to cease presenting an offer/demand to the users of the data processing system when a predetermined variable of the index which is incremented on each consultation exceeds a predetermined value.

Accordingly, offers/demands which are too old can be verified to see if they are still current, or even eliminated, which makes the information supplied by the data processing system more reliable.

The data processing system is advantageously adapted to effect a selection from multiple offers/demands corresponding to the same request in accordance with predetermined criteria.

The data processing system is preferably adapted to enable a user unknown to a secondary data processing server to communicate to the data processing system identification information required by that secondary data processing server with a view to subscribing to it.

A request corresponding to an offer/demand can include space and time data, in particular if it is an offer/demand for transport.

In one particular embodiment of the invention, the data processing system includes a sending device for sending a response to a user who has formulated a request by electronic mail or facsimile or as a voice message.

The data processing system preferably includes a receiving system for receiving location information concerning the geographical location of the user of the data processing system and/or that of the travelers, goods or services concerned, in order to advise a user who has formulated a request including space data that an offer/demand satisfying that request is located near that user or on their route.

The invention also provides a method of facilitating confronting an offer and a demand, characterized in that it includes the supply of a data processing system as defined above.

The invention also provides a method of facilitating confronting an offer and a demand, characterized in that it includes the following steps:

receiving requests corresponding to new offers/demands the requests being formulated by users of the data processing system, receiving data corresponding to offers/demands not yet satisfied from a plurality of secondary data processing servers, the secondary data processing servers being themselves adapted to confront an offer and a demand, after receiving a new request corresponding to a new offer/demand formulated by a user of the data processing system, verifying if there is an offer/demand not yet satisfied, received from a secondary data processing server or transmitted previously by a user of the data processing system that can respond to the new request, if not, storing the new request in the data processing system and/or sending data corresponding to the new request to at least one of the secondary data processing servers to enable confrontation with an offer/demand responding to the new request received subsequently by the secondary data processing server.

In one particular implementation of the method, the offer is an offer to transport freight or travelers and the demand is a demand for transporting freight or travelers, the components of the offer or of the demand including at least the departure point and the arrival point of the goods or travelers to be transported and the date they are to be transported.

In one particular embodiment of the method, the method further includes the step of communicating in real time to the data processing system information concerning the location of the users or the goods or services concerned.

Thus terrestrial or airborne transportation means can be equipped with terminals for automatically sending information concerning the location and the load of the transportation means to the data processing system.

The location information is advantageously analyzed by the data processing system in the light of the demands/offers formulated by the users of the data processing system and information is sent to the transportation means to report transport demands/offers to them if the transportation means are near the goods or travelers to be transported and able to transport them.

The invention will be better understood on reading the following detailed description of a non-limiting embodiment of the invention and on examining the accompanying drawing.

FIG. 1 shows a central data processing system (also referred to as a main server) X constituting a particular embodiment of the invention.

The data processing system X includes data processing means comprising one or more computers, possibly of different kinds, such as those usually employed to implement Internet sites.

They are associated with data storage means and data transmission means.

The data processing system X can communicate with and exchange data with a plurality of secondary data processing servers, of which there are four in the example shown, namely pre-existing secondary data processing servers A, B, C and E.

Of course, the invention is not limited to a particular number of pre-existing or subsequently developed secondary data processing servers.

Data is exchanged between the data processing system X and the secondary data processing servers A, B, C or E using different communication protocols.

Thus the data processing system X can communicate with the secondary data processing server A via satellite, with the secondary data processing server B via the Internet, with the secondary data processing server C by facsimile and with the secondary data processing server E by videotex.

Each secondary data processing server A, B, C or E confronts an offer and a demand, the offer or the demand being formulated by a user of the secondary data processing server.

Thus the secondary data processing server A receives offers $O_A$ and demands $D_A$ from users $C_A$, the secondary data processing server B receives offers $O_B$ and demands $D_B$ from users $C_B$, the secondary data processing server C receives offers $O_C$ and demands $D_C$ from users $C_C$ of the secondary data processing server C and the secondary data processing server E receives offers $O_E$ and demands $D_E$ from users $C_E$ of the secondary data processing server E.

The secondary data processing servers A, B, C and E may require a subscription or entry of information relating to the user of the secondary data processing server before they respond to a request corresponding to an offer/demand.

In the example described here, each secondary data processing server A, B, C or E is a freight exchange and receives from its users $C_A$, $C_B$, $C_C$ or $C_E$ requests corresponding to offers or demands for transporting goods.

The secondary data processing server A, just like the other secondary data processing servers B, C and E, is adapted, on receiving a new request from a user $C_A$, to search for an offer $O_A$ or a demand $D_A$ stored by the secondary data processing server and responding to the request.

The data processing system X stores all offers and demands of the secondary data processing servers A, B, C and E with which it is associated by successively interrogating the secondary data processing servers A, B, C and E.

This creates virtual freight exchanges A', B', C' and E' within the data processing system X.

The data processing system X periodically updates the virtual exchanges A', B', C' and E' by storing all new offers or demands received by any of the secondary data processing servers A, B, C or E.

Thus a user $C_X$ of the data processing system X who formulates a request corresponding to an offer or to a demand is sure to obtain a service at least equal to that it would have obtained by directly interrogating in turn each of the secondary data processing servers A, B, C or E with which the data processing system X is associated.

The data processing system X also stores offers $O_X$ and demands $D_X$ corresponding to requests previously formulated by other users $C_X$ of the data processing system X and not yet satisfied.

The set of offers $O_X$ and demands $D_X$ constitutes a freight exchange internal to the data processing system X, as it were.

In this, example, the data processing system X identifies each user $C_X$ in order to authorize the supply of results only to authorized users $C_X$.

Access to the data processing system X can therefore require a subscription that has to be paid for, or access could be free but a charge levied for supplying results.

In this example, the data processing system X also enables a user $C_X$ who already subscribes to at least one of the secondary data processing servers A, B, C or E to communicate information such as a password specific to that secondary data processing server and thereafter enabling the data processing system X to consult the secondary data processing server on behalf of the user $C_X$ concerned.

In the case of transporting goods, the data processing system X communicates with a sending system S and a receiving system R which are themselves associated with terminals T installed on vehicles.

The terminals T transmit information concerning their geographical location to the receiving system R.

The vehicles equipped with the terminals T are advantageously fitted with a GPS or similar system to indicate their location to the data processing system X.

The terminals T preferably transmit ancillary information, for example their available capacity for transporting goods and their intended route.

As mentioned above, on receiving a new request corresponding to an offer or a demand for transporting goods sent to it by a user $C_X$, the data processing system X searches the stored offers and demands from the secondary data processing servers and the offers $O_X$ and demands $D_X$ corresponding to requests previously formulated by users $C_X$ of the data processing system X for an offer/demand corresponding to the new request.

If there is more than one offer/demand that can satisfy the new request formulated by the user $C_X$, the data processing system X proposes offers/demands to the user $C_X$ after sorting them in accordance with predetermined criteria, for example criteria of price, transport terms and conditions or insurance.

If there is no offer/demand stored in the data processing system X that can respond to a new request formulated by a user $C_X$, the data processing system X stores the offer $O_X$ or the demand $B_X$ corresponding to the new request and also transmits the offer or request to the secondary data processing server(s) to which that user subscribes.

For example, if the user subscribes to freight exchange A, the data processing system X deposits the offer or demand corresponding to the new request from the user in freight exchange A.

As a result, a user $C_A$ of only the secondary data processing server A can receive a proposal in respect of the offer or demand that has just been transmitted in this way by the data processing system X and the user $C_X$ of the data processing system X who subscribes to freight exchange A receives from the secondary data processing server A a proposal in respect of a new offer $O_A$ or a new demand $D_A$ responding to their request.

A user of a secondary data processing server who subscribes to that secondary data processing server and also uses the data processing system X is therefore sure to receive from the data processing system X a proposal for service which is at least equal to that which would have originated from the secondary data processing server if the data processing system X had not been used.

However, one advantage of the data processing system X is that it widens the range of offers or demands consulted, because a user of the data processing system X who is a client of only the secondary data processing server A, for example, will receive proposals in respect of offers or demands from the secondary data processing servers B, C and E without subscribing to them.

In the case of a demand for transporting goods from one point to another, for example, the data processing system X can also use the sending system S to send a proposal to complete its load to any vehicle equipped with a terminal T in the vicinity of the point of departure of the goods or whose route passes close to that departure point and which has sufficient transportation capacity.

The data processing system X advantageously assigns to the stored offers and demands an index including information such as, for example, the identity of the secondary data processing server from which the offer or the demand originates, how long the demand has been present and the frequency with which it has been consulted, in order to eliminate from the range of offers and demands consulted on receiving a new request offers and demands which are too old or have been consulted more than a predetermined number of times.

The data processing system X can therefore propose to users $C_X$ only offers or demands which are still current.

Generally speaking, the secondary data processing servers A, B, C and E will be consulted by the data processing system X and the offers and demands repatriated to the data processing system X at a frequency selected according to how quickly the content of the offers and demands proposed by secondary data processing servers changes with time.

When a user formulates a new request, the data processing system X can propose offers/demands from secondary data processing servers in a predetermined order, for example it can propose offers/demands from secondary data processing servers which charge for the service before proposing offers/demands from secondary data processing servers providing free access, for example to give priority in terms of the quality of the offers/demands proposed to the users of the data processing system X.

The data processing system X advantageously enables users to impose their own criteria for the presentation of offers/demands responding to a request, if necessary.

A user who has formulated a request that has not been satisfied immediately is advantageously alerted to this by the data processing system X, using any appropriate transmission means, for example electronic mail or fax or a telephone call to a mobile telephone.

Of course, the invention can equally apply to the transportation of travelers, the secondary data processing servers being reservation systems associated, with airlines offering flights on given dates to users looking for available seats to certain destinations on given dates.

When the secondary data processing servers are reservation servers associated with airlines, if the data processing system X cannot satisfy a request corresponding to a transport demand formulated by a user of the data processing system X, the latter deposits the user's request with the reservation systems so that the airlines can afterwards contact the user directly if a seat becomes available that can satisfy the demand of that user.

The embodiment of the invention that has just been described can be modified in various ways without departing from the scope of the invention.

In particular, the invention can be applied to confronting an offer and a demand concerning goods or services other than transporting goods.

The invention claimed is:

1. A data processing system adapted to confront offers and demands for matching an offer to a demand, said data processing system being configured to:

receive and store new requests corresponding to one of new offers and new demands, wherein the new requests are formulated by users of the data processing system;

receive and store data corresponding to one of pending offers and pending demands from a plurality of secondary data processing servers, wherein the secondary data processing servers are each adapted to confront offers and demands to match an offer to a demand; and after receiving a new request corresponding to one of a new offer and a new demand formulated by a user of the data processing system, determine whether the new request matches one of the pending offers and the pending demands that originated from one of the secondary data processing servers or one of the users of the data processing system, wherein if no match is determined, the data processing system is further configured to perform at least one of:

storing the new request in the data processing system; and sending data corresponding to the new request to at least one of the secondary data processing servers to enable confrontation of the new request with one of a subsequent offer and a subsequent demand subsequently received by the secondary data processing server to match the new request with one of the subsequent offer and the subsequent demand.

2. A data processing system according to claim 1, said data processing system being configured to:

exchange data with at least two secondary data processing servers using different communication protocols.

3. A data processing system according to claim 1, wherein at least one of the secondary data processing servers is adapted to not respond to a request corresponding to one of an offer and a demand before receiving identification information of the user originating the request.

4. A data processing system according to claim 1, said data processing system being adapted to automatically update all offers and demands stored by the data processing system for confronting the new request, updating being effected at sufficiently short time intervals for the user of the data processing system to have access to recent offers or demands sent to the secondary data processing servers by the users of the secondary data processing servers.

5. A data processing system according to claim 1, said data processing being adapted to automatically update the offers and the demands stored by the data processing system for confronting the new request to verify whether the new request matches one of an offer and a demand originating from a user of the data processing system.

6. A data processing system according to claim 1, wherein, for a predetermined user of the data processing system who is a subscriber to only a subset of the secondary data processing servers sending data to the data processing system, in the event of a request formulated by the predetermined user which the data processing system has been unable to satisfy, the data processing system transmits the request that has not been satisfied to only the subset of the secondary data processing servers, to enable that request to be confronted with one of the subsequent offer and the subsequent demand received by the subset of the the secondary data processing servers.

7. A data processing system according to claim 1, wherein the data processing system is adapted to effect a selection from multiple offers or demands corresponding to the same request in accordance with predetermined criteria.

8. A data processing system according to claim 1, wherein the data processing system is adapted to enable a user unknown to a secondary data processing server to communicate to the data processing system identification information required by that secondary data processing server with a view to subscribe to the secondary data processing server.

9. A data processing system according to claim 1, wherein a request corresponding to an one of an offer and a demand includes space and time data.

10. A data processing system according to claim 1, wherein the data processing system includes a sending device for sending a response to a user who has formulated a request by electronic mail or facsimile or as a voice message.

11. A data processing system according to claim 1, wherein it includes a receiving system for receiving location information concerning the geographical location of the user of the data processing system and/or that of the travelers, goods or services concerned, in order to communicate to a user who has formulated a request including space data that one of an offer and a demand which satisfies the request is located near the user or on their route.

12. A data processing system according to claim 1, wherein the new requests each comprises data relating to transport of at least one of travelers and goods.

13. A data processing system according to claim 1, wherein each offer or demand received by the data processing system from one of the secondary data processing servers is assigned an index including at least the identity of the secondary data processing server originating the offer or demand.

14. A data processing system according to claim 13, wherein the index further includes information on the frequency with which the offer or the demand has been consulted.

15. A data processing system according to claim 13, wherein the index further includes information on how long the offer or the demand has been processed by the data processing system.

16. A data processing system according to claim 13, wherein the data processing system is adapted to cease presenting of an offer and demand to the users of the data processing system when a predetermined variable of the index wherein exceeds a predetermined value, wherein the index is incremented on each consultation.

17. A method of facilitating confronting offers and demands for matching an offer to a demand, comprising:

receiving and storing requests corresponding to one of new offers and new demands, wherein the requests are formulated by users of the data processing system;

receiving and storing data corresponding to one of pending offers and pending demands from a plurality of secondary data processing servers, wherein the secondary data processing servers are each adapted to confront an offer and a demand; and after receiving a new request corresponding to one of a new offer and demand formulated by a user of the data processing system, determining whether the new request matches one of a pending offer and a pending demand stored in the data processing server and received from a secondary data processing server or transmitted previously by the user of the data processing system, wherein if no match is determined, the method of further comprises at least one of:

storing the new request in the data processing system; and sending data corresponding to the new request to at least one of the secondary data processing servers to enable confrontation of the new request with one of a subsequent offer and a subsequent demand subsequently received by the secondary data processing server to match the new request with one of the subsequent offer and the subsequent demand.

18. A method according to claim 17, wherein the offer is an offer to transport freight or travelers and the demand is a demand for transporting freight or travelers, the components of the offer or of the demand including at least the departure point and the arrival point of the goods or travelers to be transported and the date they are to be transported.

19. A method according to claim 17, further comprising: communicating in real time to the data processing system information concerning the location of the users or the goods or services concerned.

20. A method according to claim 17, further comprising: automatically sending to the data processing system from a transportation means equipped with terminals for sending information concerning the location and the load of the transportation means, wherein the transportation means includes one of a terrestrial means and an airborne transportation means.

21. A method according to claim 20, wherein the location information is analyzed by the data processing system based on the demands or the offers formulated by the users of the data processing system, wherein information is sent to the transportation means to report transport demands or transport offers to the transportation means if the transportation means are near the goods or travelers to be transported and able to transport them.

* * * * *

UNITED STATES PATENT AND TRADEMARK OFFICE
CERTIFICATE OF CORRECTION

PATENT NO. : 7,359,862 B2  
APPLICATION NO. : 10/415703  
DATED : April 15, 2008  
INVENTOR(S) : Eric Elgrably It is certified that error appears in the above-identified patent and that said Letters Patent is hereby corrected as shown below:

On the Title page of the patent, item (73) should replace the assignee's name of "Electronic, Mobile and Geographic B.V., Amsterdam (NL)"

with the correct assignee information of:

--Eric Elgrably, Casablanca (MA)--

Signed and Sealed this

Thirteenth Day of January, 2009

JON W. DUDAS  
*Director of the United States Patent and Trademark Office*